United States Patent
Jester

(10) Patent No.: US 6,660,182 B2
(45) Date of Patent: Dec. 9, 2003

(54) BLENDS OF STRETCHABLE LIQUID CRYSTAL POLYMERS WITH THERMOPLASTICS

(75) Inventor: Randy Douglas Jester, Greer, SC (US)

(73) Assignee: Ticona LLC, Summit, NJ (US)

( * ) Notice: Subject to any disclaimer, the term of this patent is extended or adjusted under 35 U.S.C. 154(b) by 28 days.

(21) Appl. No.: 09/939,382

(22) Filed: Aug. 24, 2001

(65) Prior Publication Data

US 2002/0060309 A1 May 23, 2002

Related U.S. Application Data

(60) Provisional application No. 60/229,942, filed on Sep. 1, 2000.

(51) Int. Cl.$^7$ ............................................... C09K 19/52
(52) U.S. Cl. .................................. 252/299.01; 528/190
(58) Field of Search .................... 252/299.01, 299.7; 528/190

(56) References Cited

U.S. PATENT DOCUMENTS

| | | | |
|---|---|---|---|
| 4,267,289 A | 5/1981 | Froix | 525/444 |
| 4,386,174 A | 5/1983 | Cogswell et al. | 524/27 |
| 4,414,365 A | 11/1983 | Sugimoto et al. | 525/437 |
| 4,433,083 A | 2/1984 | Cogswell et al. | 524/27 |
| 4,460,735 A | 7/1984 | Froix | 524/537 |
| 4,460,736 A | 7/1984 | Froix et al. | 524/539 |
| 4,489,190 A | 12/1984 | Froix | 524/539 |
| 4,567,227 A | 1/1986 | Kiss | 524/538 |
| 4,728,698 A | 3/1988 | Isayev et al. | 524/439 |
| 5,011,894 A | 4/1991 | Robeson et al. | 525/437 |
| 5,182,334 A | 1/1993 | Chen, Sr. et al. | 525/397 |
| 5,225,488 A | 7/1993 | Baird et al. | 525/132 |
| 5,260,380 A * | 11/1993 | Isayev | 525/177 |
| 5,366,663 A | 11/1994 | Romer et al. | 525/425 |
| 5,418,281 A | 5/1995 | Yung et al. | 545/602 |
| 5,498,689 A | 3/1996 | Furuta et al. | 528/214 |
| 5,541,240 A | 7/1996 | Makhija et al. | 523/351 |
| 5,679,284 A | 10/1997 | Kurita | 252/299.01 |
| 5,981,007 A * | 11/1999 | Rubin et al. | 428/35.5 |
| 6,132,884 A | 10/2000 | Linstid, III et al. | 428/480 |
| 6,207,790 B1 | 3/2001 | Linstid, III et al. | 528/190 |
| 6,221,962 B1 * | 4/2001 | Heino et al. | 525/133 |
| 6,222,000 B1 | 4/2001 | Linstid, III et al. | 528/190 |
| 6,294,640 B1 * | 9/2001 | Linstid, III et al. | 528/190 |

FOREIGN PATENT DOCUMENTS

| | | |
|---|---|---|
| EP | 0169947 | 2/1986 |
| EP | 0487337 | 5/1992 |
| EP | 0634438 | 1/1995 |
| WO | WO 93/24574 | 12/1993 |
| WO | WO 95/04782 | 2/1995 |
| WO | WO 95/15360 | 6/1995 |
| WO | WO 95/23183 | 8/1995 |
| WO | WO 96/00752 | 1/1996 |

* cited by examiner

*Primary Examiner*—Mark F. Huff
*Assistant Examiner*—Jennifer R Sadula

(57) ABSTRACT

The present invention relates to a stretchable blend comprising a stretchable liquid crystal polymer and a thermoplastic. These stretchable blends can be stretched at the same temperature range as many conventional thermoplastics. During a post orientation process, such as fiber or film stretching, the stretchable liquid crystal polymer can stretch and deform along with the thermoplastic matrix maintaining adhesion between the liquid crystal polymer domains and the thermoplastic matrix thereby improving the physical properties of the oriented article.

25 Claims, No Drawings

BLENDS OF STRETCHABLE LIQUID CRYSTAL POLYMERS WITH THERMOPLASTICS

This application claims the benefit of U.S. Provisional Application No. 60/229,942 filed on Sep. 1, 2000.

FIELD OF THE INVENTION

The present invention relates to blends of Liquid Crystal Polymers (LCPs) with thermoplastics, and more particularly to blends of stretchable liquid crystal polymers with thermoplastics suitable for use in the production of a variety of oriented shaped articles including films, fibers, and blow molded forms.

BACKGROUND OF THE INVENTION

Anisotropic melt-forming polymers, also known as liquid crystalline polymers or "LCPs" are well known in the art. LCPs exhibit a parallel ordering of molecular chains in the melt phase and are also termed "thermotropic" liquid crystal polymers. LCPs are known to have many excellent physical properties, such as higher tenacity and modulus, additionally, LCPs have good barrier resistance to many chemicals, gases and water vapor.

Blending LCPs with other thermoplastic polymers has been shown to improve some of the physical properties of the thermoplastic polymers, depending on process and rheological conditions. Furthermore, since LCPs have reduced viscosities in the melt phase, a LCP in a blend has importance as a processing flow aid for molding. Examples of blends of LCPs with thermoplastics are disclosed in U.S. Pat. Nos. 4,386,174; 4,433,083 and 4,489,190; the LCP components of such blends being polymers with highly ordered crystalline structures that, although drawable in the melt, generally lack the ability to be stretched to a significant degree at temperatures below the molten state. As used herein, liquid crystalline polymers with highly ordered crystalline structures that are not able to be stretched to a significant degree at temperatures below their molten state are referred to as "conventional LCPs".

A problem frequently encountered with blends of conventional LCPs and thermoplastics is that the improvement of their physical properties may be hampered due to the incompatibility of the conventional LCPs with the post extrusion orientation techniques commonly utilized for many thermoplastic articles. This problem is believed to be due to poor adhesion between the conventional LCPs and the thermoplastics and the inability to stretch these LCPs at normal orientation conditions of many non-liquid crystal thermoplastics. Compatibilizers, such as those described in WO 93/24754 and WO 96/00752, have been known to improve properties of the blend, but even they are insufficient especially when the blends are used in oriented articles such as fiber or films formed by stretching because conventional LCP domains do not stretch at temperatures below their melting point. Fiber or film made from such blends and oriented at temperatures typically used to stretch non-liquid crystal thermoplastics, result in separation of the LCP from the thermoplastic matrix resulting in poorer physical properties such as break strain or toughness.

Therefore, it is an objective of the present invention to improve the physical properties of LCP/thermoplastic blends.

It is another object of the present invention to improve the physical properties of oriented articles made from LCP/thermoplastic blends.

SUMMARY OF THE INVENTION

The objects of the present invention are achieved by providing stretchable LCPs to be used in the LCP/thermoplastic blend. These stretchable LCPs can be stretched at the same temperature range as many of the non-liquid crystal thermoplastics commonly used in extrusion applications, e.g., the production of fibers, films, blow molded articles, and the like. During a post orientation process, such as fiber or film stretching, the stretchable LCP can stretch and deform along with the non-liquid crystal thermoplastic matrix, maintaining adhesion between the LCP domains and the thermoplastic matrix. It has been found that blends in accordance with the subject invention provide oriented articles, for example fibers, films and blow molded articles, having improved toughness compared to oriented articles made from blends of conventional LCPs and non-liquid crystal thermoplastics.

DETAILED DESCRIPTION OF THE INVENTION

The present invention relates to a melt mixture of a stretchable LCP with a thermoplastic polymer resulting in a blend with improved physical properties as compared to a conventional LCP blend. In a further embodiment, this invention relates to blends of stretchable LCPs, and thermoplastics, wherein said stretchable LCPs are present in such blends in an amount of from about 1 to about 30 percent by weight, based on the total weight of the LCP and thermoplastic components thereof.

The extent to which a polymer can be stretched or drawn depends upon the temperature at which stretching occurs as well as the form and size of the material that is being stretched. In the present application, the term "stretchable" polymer means a polymer capable of being stretched to at least 100% elongation (i.e., at least 100% break strain) before the break or rupture, when spun into tapes and tested according to the Tape Stretching Procedure set forth below. Break strain or percent elongation is the final length ($L_f$) of the polymer after stretching minus the initial length ($L_i$) before stretching divided by the initial length $L_i$ and multiplied by 100 (i.e., % elongation=$[(L_f-L_i)/L_i)]\times 100$). For a film or other flat articles, the percent elongation is measured by the initial and final areas of the article (i.e., % elongation= [(final area—initial area)/initial area]×100).

Preferably, the stretchable LCPs of the present invention can be stretched to at least about 100%, 150%, 200% or even 500% elongation without tearing or breaking using the Tape Stretching Procedure set forth below.

The preferred stretchable LCPs of the present invention are, wholly aromatic LCPs. Examples of stretchable LCPs can be found in U.S. Pat. No. 5,656,714; U.S. application Ser. No.: 09/483,103, now U.S. Pat. No. 6,222,000; U.S. application Ser. No.: 09/484,120, now U.S. Pat. No. 6,132,884; U.S. application Ser. No 09/483,765, now U.S. Pat. No. 6,207,790; and copending U.S. application Ser. No. 09/783,057; all of which are herein incorporated by reference in their entirety.

Stretchable LCPs are included among LCPs comprised of recurring units I, II, III, IV and V, where recurring unit I is

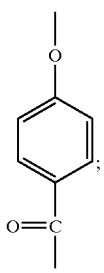

recurring unit II is:

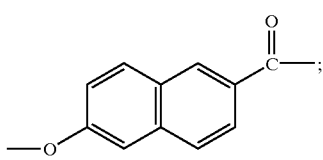

recurring unit III is:

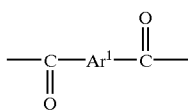

where Ar¹ is selected from the group consisting of:

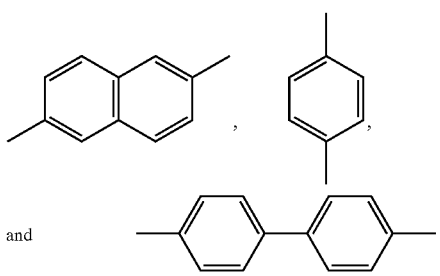

and mixtures thereof;
recurring unit IV is:

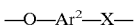

—O—Ar²—X—    IV where Ar² is selected from the group consisting of:

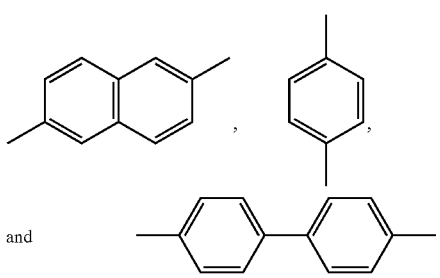

and mixtures thereof, and X is independently selected from the group consisting of O and NR² where R² is independently selected from the group consisting of hydrogen and a $C_1$ to $C_6$ alkyl; and
recurring unit V is a formula selected from the group consisting of:

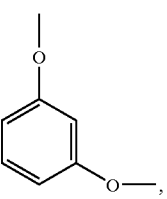

(Va)

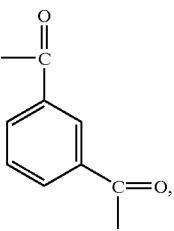

(Vb)

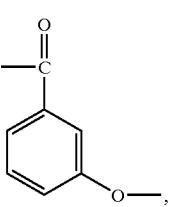

(Vc)

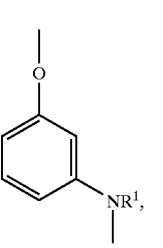

(Vd)

and

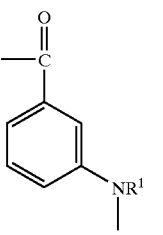

(Ve)

and mixtures thereof, where R¹ is independently selected from the group consisting of hydrogen and $C_1$ to $C_6$ alkyl. To be stretchable, such polymers are required to contain specific amounts of particular recurring units. For example, stretchable LCPs having such recurring units include polymers which consist essentially of recurring units I, II, III, IV, and V wherein:

recurring unit I is

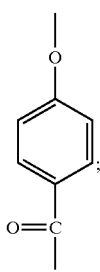

recurring unit II is:

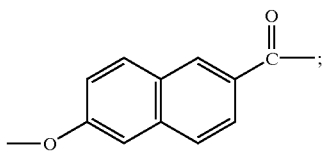

recurring unit III is:

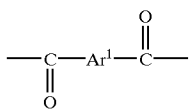

wherein $Ar^1$ is selected from the group consisting of:

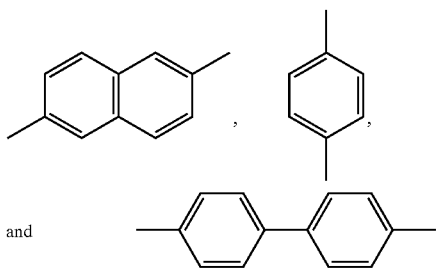

and mixtures thereof;
recurring unit IV is:

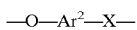

wherein $Ar^2$ is selected from the group consisting of:

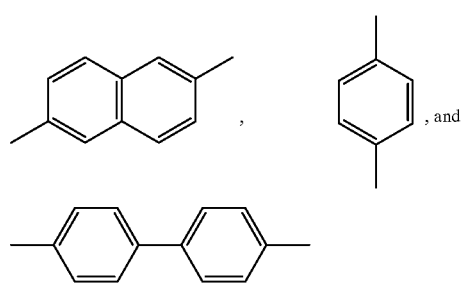

and mixtures thereof, and X is independently selected from the group consisting of O and $NR^2$ wherein $R^2$ is indepen dently selected from the group consisting of hydrogen and a $C_1$ to $C_6$ alkyl; and
recurring unit V is selected from the group consisting of:

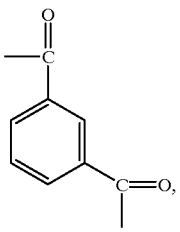

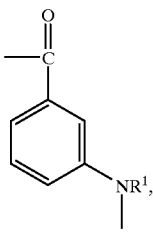

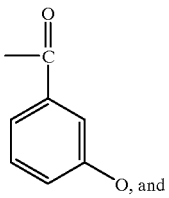

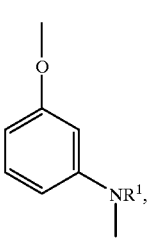

and mixtures thereof, wherein $R^1$ is independently selected from the group consisting of hydrogen and $C_1$ to $C_6$ alkyl; wherein recurring unit I is present in the polymer in an amount of from about 15 to about 60 mole percent, recurring unit II is present in the polymer in an amount of from about 15 to about 60 mole percent, recurring unit III is present in the polymer in an amount of from about 5 to about 20 mole percent, recurring unit IV is present in the polymer in an amount of from about 5 to about 20 mole percent, and recurring unit V is present in the polymer in an amount of from about 7 to about 15 mole percent and wherein:
  (a) recurring units I and II combined are present in the polymer in an amount of from about 50 to about 75 mole percent and
  (b) the polymer contains at least about 5 mole percent of recurring units of the formula:

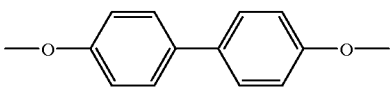

with the proviso that recurring unit II is present in the polymer in an amount of at least about 30 mole percent, if and when the polymer also contains:

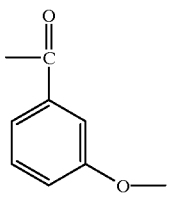

in combination with a total from 0 to about 5 mole percent of units selected from the group consisting of units (Vb), (Ve) and (Vd) and mixtures thereof. Preferably, such polymers contain from about 20 to about 40 mole percent of recurring unit I, from about 20 to about 40 mole percent of recurring unit II, from about 10 to about 15 mole percent of recurring unit III, from about 10 to about 15 mole percent of recurring unit IV and from about 10 to about 15 mole percent of recurring unit V. Stretchable LCPs such as these are described in U.S. Pat. No. 6,222,000.

Other stretchable LCPs are polymers that consist essentially of recurring unit I, II, III, IV and V, wherein:

recurring unit I is

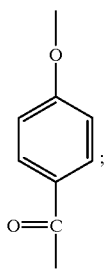

(I)

recurring unit II is:

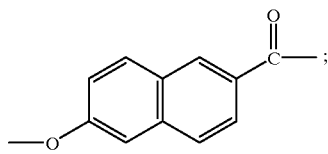

(II)

recurring unit III is:

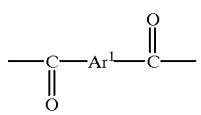

(III)

wherein is $Ar^1$ is selected from the group consisting of:

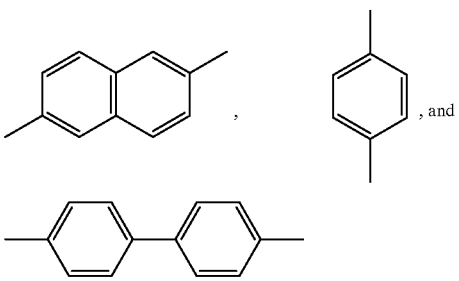

and mixtures thereof;
recurring unit IV is:

$$—O—Ar^2—X—\qquad\qquad IV$$

wherein $Ar^2$ is selected from the group consisting of:

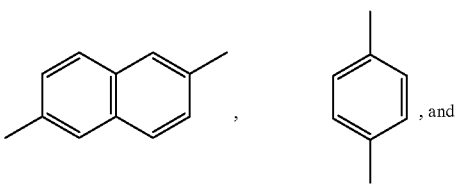

and mixtures thereof, and X is independently selected from the group
consisting of O and $NR^2$ wherein $R^2$ is independently selected from the group consisting of hydrogen and a $C_1$ to $C_6$ alkyl; and recurring unit V is a dioxy unit of the formula:

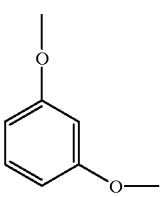

(Va)

in combination with at least one additional unit selected from the group consisting of:

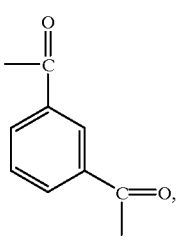

(Vb)

-continued (Vc)
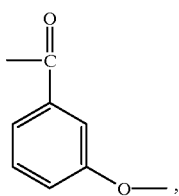

(Vd)
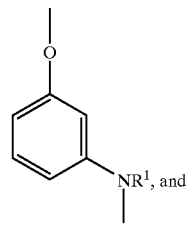

(Ve)
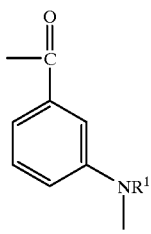

wherein $R^1$ is independently selected from the group consisting of hydrogen and $C_1$ to $C_6$ alkyl, wherein recurring unit I is present in the polymer in an amount of from about 15 to about 60 mole percent, recurring unit II is present in the polymer in an amount of from about 15 to about 60 mole percent, recurring unit III is present in the polymer in an amount of from about 5 to about 20 mole percent, recurring unit IV is present in the polymer in an amount of from about 5 to about 20 mole percent, and recurring unit V is present in the polymer in an amount of from about 7 to about 15 mole percent and wherein:

(a) recurring units I and II combined are present in the polymer in an amount of from about 50 to about 75 mole percent and (b) the polymer contains at least about 5 mole percent of recurring units of the formula:

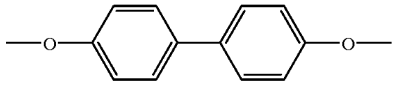

with the proviso that recurring unit II is present in the polymer in an amount of at least about 30 mole percent, if and when unit (Vc) is also present and the units (Va), (Vb), (Vd), and (Ve) combined, constitute up to about 5 mole percent of the polymer. Preferably, such polymers contain from about 20 to about 40 mole percent of recurring unit I from about 20 to about 40 mole percent of recurring unit II, from about 10 to about 15 mole percent of recurring unit III, from about 10 to about 15 mole percent of recurring unit IV and from about 10 to about 15 mole percent of recurring unit V. Stretchable LCPs such as these are described in U.S. Pat. No. 6,132,884

Stretchable LCPs also include polymers consisting essentially of recurring units I, II, III,IV and V, wherein:

recurring unit I is

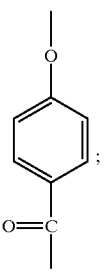
I recurring unit II is:

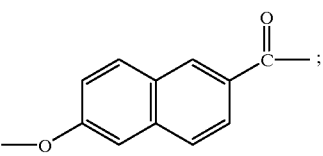
II recurring unit III is:

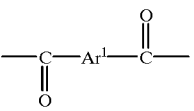
III wherein $Ar^1$ is selected from the group consisting of:

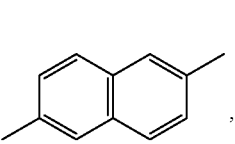 , 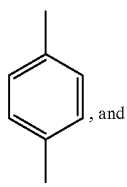 , and

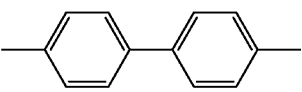

and mixtures thereof;

recurring unit IV is:

wherein $Ar^2$ is selected from the group consisting of:

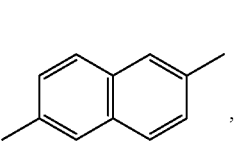 , 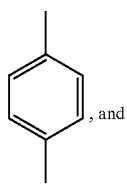 , and

-continued

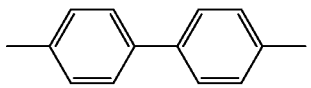

and mixtures thereof; and X is independently selected from the group consisting if O or $NR^2$ wherein $R^2$ is independently selected from the group consisting of hydrogen and a $C_1$ to $C_6$ alkyl; and recurring unit V is:

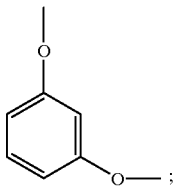

wherein recurring unit I is present in the polymer in an amount of from about 15 to about 60 mole percent, recurring unit II is present in the polymer in an amount of from about 15 to about 60 mole percent, recurring unit III is present in the polymer in an amount of from about 5 to about 20 mole percent, recurring unit IV is present in the polymer from about 5 to about 20 mole percent and recurring unit V is present in the polymer in a n amount of from about 7 to about 15 mole percent; wherein:

(a) recurring units I and II combined are present in the polymer in an amount of from about 50 to about 75 mole percent and (b) the polymer contains at least about 5 mole percent of recurring units of the formula:

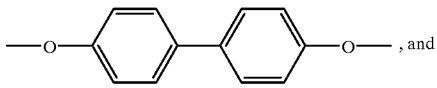, and (c) a least a portion of recurring unit III is:

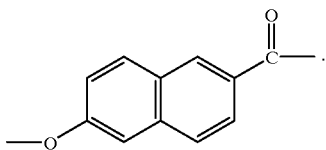

Preferably, such polymers contain from about 20 to about 40 mole percent of recurring unit 1, from about 20 to about 40 mole percent of recurring unit II, from about 10 to about 15 mole percent of recurring unit III, from about 10 to about 15 mole percent of recurring unit IV and from about 10 to about 15 mole percent of recurring unit V. Stretchable LCPs such as these are described in U.S. Pat. No. 6,207,790.

Stretchable LCPs are also included among three monomer unit polymers consisting essentially of recurring units I, II, and V wherein
recurring unit I is:

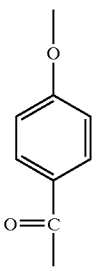

recurring unit II is:

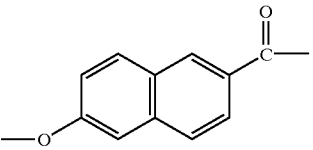

and recurring unit V is selected from the group consisting of:

(Vc)

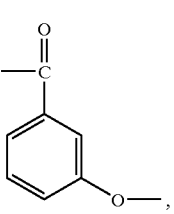

(Ve)

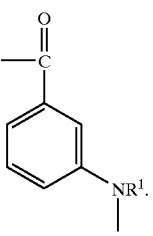

and mixtures thereof, where $R^1$ is independently selected from the group consisting of hydrogen and $C_1$ to $C_6$ alkyl and where the polymer is stretchable.

Minor amounts of other units that provide ester or ester-amide linkages may be present provided, that such units, do not obviate the properties desired by this invention.

In one embodiment of the three monomer unit polymer, recurring unit I is present in an amount of about 15 to about 35 mole %, recurring unit II is present in an amount of from about 20 to about 55 mole %, preferably about 30 to about 50 mole % and recurring unit V is present in an amount of from about 12 to about 48 mole %, preferably from about 12 to about 25 mole %.

In another embodiment of the three monomer unit polymer, recurring unit I is present in an amount of about 10 to about 50 mole %, recurring unit II is present in an amount of from about 35 to about 55 mole % and recurring unit V is present in an amount of from about 12 to about 50 mole %, preferably about 12 to 25 mole %.

In yet another embodiment of the three monomer unit polymer, recurring unit I is present in an amount of about 10 to about 50 mole %, recurring unit II is present in an amount of from about 35 to about 45 mole % and recurring unit V is present in an amount of from about 8 to about 50 mole %.

The stretchable LCP polymers of the present invention may be blended with any suitable thermoplastic. Desirably, such thermoplastics are polymers that are not liquid crystalline in nature, i.e., "non-liquid crystal thermoplastic polymers". Examples of suitable thermoplastics that may be blended with the stretchable LCPs are polyethylene, polypropylene, polybutylene, polyimide, polyamide, poly(ethersulfone), poly(etherimide), poly(etherketone), polycarbonate, poly(ethylene terephthalate), poly(ethylene napthalate), poly(butylene terephthalate), poly(phenylene sulfide), ethylene vinyl acetate, ethylene vinyl alcohol, polyvinyl chloride, polyvinyl alcohol, polyoxymethylene, poly(etheretherketone), cyclic olefin copolymer, polycyclohexylene terephthalate, and polyarylate. For many extrusion applications, non-liquid crystal thermoplastics such as polyethylene, polypropylene, polybutylene, poly(ethylene terephthalate), polyamide, ethylene vinyl acetate, ethylene vinyl alcohol, and cyclic olefin copolymer are of particular interest, with polyethylene, polypropylene, and poly(ethylene terephthalate) being representative of polymers having widespread use in the production of fibers, films, blow molded containers and other oriented articles. In the practice of this invention, extrusion grade thermoplastics that are oriented at processing temperatures of from about 120° C. to about 160° C. are of particular interest.

The amount of stretchable LCP in the blend is preferably from about 1 to about 30 wt. %, more preferably from about 5 to about 20 wt. % and even more preferably from about 5 to about 15 wt. % based on the total weight of the stretchable LCP and thermoplastic. The amount of thermoplastic in the blend is preferably an amount of from about 70 to about 99 wt. %, preferably from 80 to about 95 wt. % and even more preferably from about 85 to about 95 wt. % based on the total weight of the stretchable LCP and thermoplastic.

In an embodiment of particular interest, the subject invention relates to a melt blend comprising:
(a) a stretchable liquid crystal polymer; and
(b) a non-liquid crystal thermoplastic polymer capable of being oriented at processing temperatures of from about 120° C. to about 160° C.,
wherein said liquid crystal polymer is present in the blend in an amount of from about 5 to about 15% by weight, based on the total weight of the stretchable liquid crystal polymer and the non-liquid crystal thermoplastic polymer components thereof.

Another component that may be added in the blend is a compatibilizer. The task of a compatibilizer is to achieve a more uniform dispersed blend such as by diminishing the surface tension and/or improving adhesion between the components. Any suitable compatibilizer may be used to achieve a uniform dispersed blend such as those described in WO 96/00752 and WO 93/24574, herein incorporated by reference. When present, the compatibilizer is typically used in an amount of from about 0.1 to about 30 weight percent, based on the total weight of the stretchable liquid crystal polymer and the thermoplastic polymer Examples of suitable general classes of compatibilizers are: a polyester polyurethane, a polyether polyurethane, a polyester elastomer, a polyether elastomer, a polyamide, a polyether polyamide, a polyether polyimide, or a functionalized polyolefin, where said functionalized polyolefin comprises functional groups selected from the group consisting of: a carboxyl group and its esters, a carboxylic anhydride group, a glycidyl group, an alkoxysilane group and combinations thereof.

Examples of specific compatibilizers that may be used are ethylene-maleic anhydride copolymer, ethylene-methyl acrylate copolymer, ethylene-methyl acrylate copolymer grafted with maleic anhydride, ethylene-methyl acrylate-maleic acid terpolymer, ethylene-glycidyl methacrylate copolymer, ethylene-methyl acrylate-glycidyl methacrylate terpolymer, ethylene-methyl methacrylate-acrylic acid terpolymer, ethylene-vinyl acetate copolymer, an alkoxysilane modified ethylene-ethylacrylate copolymer, ethylene-acrylic acid copolymer, and a blend of polypropylene grafted with maleic anhydride with a dimer based polyamide.

If desired, the blends may contain one or more additional optional components such as for example, anti-blocking agents, anti-static agents, antioxidants, blowing agents, crystallization agents, colorants, dyes, lubricants, processing aids, stabilizers, fillers, reinforcing agents, impact modifiers, mold release agents, pigments, UV resistant agents, antifogging agents, wetting agents, and the like. Although not typically present in blends used in the production of stretched articles, additives such as such as fillers, reinforcing agents impact modifiers, and mold release agents may be used in blends used in specialty blow molding and/or thermoforming applications.

Any suitable method may be used to produce the blends of the present invention. For example, conventional extrusion equipment such as single or twin screw extruders may be used to produce the stretchable LCP blends. It is preferred that the composition be well-dispersed in order to produce a blend with superior properties. Conditions that may affect the dispersion of the blend include equipment, processing temperatures, rotation speed of the screw, feed rate and throughput. It is well within one skilled in the art of polymer blending to optimize these variables in order to produce a well-dispersed blend. Typically, high shear screw configurations are used to produce well-dispersed blends. The ratio of the melt viscosity of the dispersed phase to the matrix phase of the blend is another key variable well known to affect physical properties. A close match of melt viscosity at the blend process temperature, close to a ratio of 1, tends to yield the finest dispersed domains in the blend resulting in improved properties. Finally, a masterbatch blending process is preferred for compositions at low levels of either LCP or thermoplastic to ensure there is excellent dispersion of reproducible quantities of each resin.

It should also be noted that the dispersion of the blend might be affected by the order in which the components are mixed. For example, a well-dispersed blend may result when the polymer components are mixed first, and a compatibilizer is added later. Other times, a well-dispersed blend is produced when a portion of a compatibilizer is first blended together with the polymer components and the remaining portion of the compatibilizer is added later.

One of the advantages of the stretchable LCP blends is in the end use applications such as fiber stretching, film orientation and thermoforming, wherein orientation of the resulting articles is achieved by stretching or drawing. Conventional thermoplastics that are not stretched or drawn tend to have poor physical properties such as low tenacity and modulus. These conventional thermoplastics must be heated above their glass transition temperature, and stretched in order to orient the polymers and improve their physical properties. The problem with blends of conventional LCPs and non-liquid crystal thermoplastics is that they do not stretch well at temperatures typically used for conventional thermoplastic orientation processes, (e.g., temperatures of from about 1200 to about 160° C. for polyolefins and poly(alkylene terephthalates). Conventional LCP domains in thermoplastic blends, when stretched below their melting point, may result in separation between the thermoplastic matrix and LCP domains and poor stretching performance for the blend as a whole. Although not wishing to be bound by any theory, it is believed that these separated domains diminish the physical properties of oriented articles made from blends of conventional LCPs and thermoplastics.

The blends containing stretchable LCPs have an advantage over blends containing conventional LCPs because they can be stretched at temperatures used for conventional thermoplastic orientation. Although not wishing to be bound by any theory, it is believed that stretchable LCP domains are less likely to separate from the thermoplastic matrix when the blend is stretched, resulting in better physical properties. In addition, fine fibrillar LCP domains in a fiber are further elongated during fiber orientation and LCP domains in a film can be biaxially oriented into a preferred platelet geometry during a film biaxial orientation process to further improve properties.

The stretchable LCP blend of the present invention may be processed into various shaped articles by known conventional thermoplastic processes. Shaped articles are any type of articles or parts formed by conventional processes, including but not limited to injection molding, co-extrusion, extrusion blow molding, stretch blow molding, biaxial stretch blow molding, vacuum forming, compression molding, dry lamination, sandwich lamination, thermoforming, fiber spinning, or combinations thereof. Desirably, articles made from the blend of the present invention may be stretched to at least 100% elongation, preferably at least 200% elongation when stretched at a normal processing temperature of the thermoplastic component thereof.

The blends are particularly suited for forming sheets and films because of their ability to be heat stretched at temperatures used for conventional thermoplastics. Hollow shaped articles such as containers (e.g., bottles, bags, tanks, packages and the like) may be produced by extrusion blow molding, direct blowing, injection blow molding, biaxial stretch blow molding or the like processes.

The stretchable LCP blends may also be laminated with thermoplastics such as polyolefins (e.g., polyethylene and polypropylene), polyesters (e.g., polyethylene terephthalate, polybutylene terephthalate, and polyethylene naphthalate), and polyamides (e.g., nylon) to form multilayer films. Laminated films, sheets, tubes and the like may be produced by co-extrusion, dry lamination, sandwich lamination and like processes and laminated containers such as bottles, bags, tanks, and other like containers may be produced by blow molding, stretch blow molding, vacuum forming, compression molding or the like molding processes.

The LCP blends of the present invention have advantages over conventional LCP blends because of their ability to be stretched in combination with excellent gas barrier properties. The stretchable LCP blends are especially suitable for various packaging material and containers for which high oxygen barrier properties are required such as foods, medicines, cosmetics, textiles industrial chemicals, and the like.

Further, the stretchable LCP blends may also be used for producing fibers such as monofilaments, multifilaments and bicomponent fibers using conventional fiber forming equipment.

Particularly, the stretchable LCP blends may be used as at least one component in a bicomponent fiber because of their ability to be stretched at temperatures used for fiber stretching. Bicomponent fibers are well known and may be defined as a fiber having at least two distinct cross-sectional domains respectively formed from polymers having different relative viscosities. The distinct domains may be formed by at least two different polymers, or the same polymer class having different relative viscosities. Bicomponent fibers are intended to include, but are not limited to core and sheath fiber structures, side by side fiber structures, tipped fiber structures, micro-denier structures and mixed fiber structures. These types of Bicomponent fiber structures are described in U.S. Pat. No. 6,074,590, herein incorporated by reference.

In addition to the stretchable LCP blend, any type of fiber forming polymer may be used as a component in a bicomponent fiber. Suitable classes of polymers that may be used, include but are not limited to polyamides, polyesters, acrylics, and polyolefins. Specifically, nylon, low and high density polyethylene, polypropylene and polyethylene terephthalate may be employed as one of the components in a bicomponent fiber.

The bicomponent fibers are spun using conventional fiber-forming processes and equipment such as those described in U.S. Pat. Nos. 6,074,590; 5,948,528; 5,618,479; 5,162,074; 5,125,818; 5,344,297 and 5,445,884, herein incorporated by reference. Basically, spinning of bicomponent fibers involves coextrusion of the two or more components, (e.g., different polymers), to form several single filaments utilizing extrusion equipment to bring together the different components in a desired predetermined arrangement.

As mentioned previously, the stretchable LCP blends may be used as any component in the bicomponent fiber. For example, in a core and sheath fiber, the stretchable LCP blend could be used as either the core or the sheath component. One such example would have the stretchable liquid crystal polymer blend as the core and polyethylene terephthalate as the sheath. The stretchable LCP blend core component would contribute high modulus and tenacity as well as low elongation at room temperatures. Another example would have the stretchable LCP blend as the sheath and polyethylene terephthalate as the core to improve harsh environment capabilities because of the superior barrier properties of the stretchable LCP blend.

Tape Stretching Procedure

Polymers are melt spun into tapes using a Micromelt™ apparatus. The apparatus is equipped with a 0.127 mm by 6.35 mm die. Melt temperatures typically vary between about 250–300° C. depending upon the melt characteristics of the LCP sample. Throughput rates are 0.45 cc/min; take-up roller speeds are 2 rpm; and pack pressures typically range from about 100 kg/cm$^2$ to about 290 kg/cm$^2$, depending upon the $T_g$ (or $T_m$) of the polymer. The resulting tapes will have an approximate thickness of 0.05 mm and a width of about 6 mm.

Test specimens for stretching should be 12.7 cm in length cut from each tape. Specimens are placed in a preheated Instron oven, allowed 6 minutes to come to temperature and then tested on an Instron type universal tester (equipped with a thermal chamber), set to a test temperature of 150° C. (or a temperature 40° C. above $T_g$ for polymers for polymers having higher $T_g$ values). The gauge length is set at 25 mm and the crosshead speed is set at 50.8 mm/min. The % break strain or the percent elongation is calculated at the break point.

EXAMPLE 1 AND C1

The non-stretchable LCP used in Example 1 and C1 was Vectra® A950 supplied by Ticona, the engineering resins business of Celanese Ag. The polyester used in Example 1 and C1 was a PET bottle resin (grade 86H) supplied by KoSa. The stretchable LCP used in the blend contained 30 mole % p-hydroxybenzoic, 30 mole % 6-hydroxy-2-napthoic acid, 20 mole % terephthalic acid, 10 mole % resorcinol and 10 mole % 4,4'-biphenol monomer units, and had a melt viscosity (MV) of 130 kpa at a shear rate of 1000 sec$^{-1}$ when measured in a capillary rheometer using an orifice 1 mm in diameter and 20 mm long.

The polymers were dried overnight before they were blended. The PET was dried at 130° C. and the LCPs were dried at 90° C. The polymers were blended on a Haake extruder to prepare 90% PET/10% LCP blends by weight. The blends were melt spun into tapes using a Micromelt™ apparatus. The apparatus was equipped with a 0.127 mm by 6.35 mm die. Throughput rates were 0.45 cc/min; take-up roller speeds were 2 rpm; and pack pressures ranged from about 100 kg/cm$^2$ to about 290 kg/cm$^2$. The resulting tapes had an approximate thickness of 0.05 mm and a width of about 6 mm.

Drawn or stretched samples were prepared by taking the tape samples and placing them in a tensile tester hot box at 140° C. The tapes were conditioned for 6 minutes and then stretched to 200% elongation at 100%/min strain rate while maintaining the tapes at 140° C. These drawn samples were then reconditioned at 23° C. and 50% relative humidity (RH) for measurement of % break strain, using an Instron type universal tester. The gauge length was set at 25 mm and the crosshead speed was set at 50.8 mm/min. In this way, the % break strain for previously drawn samples was obtained. The % break strain or the percent elongation, calculated at the break point and reported as an average of five samples, is shown in Table 1 below.

TABLE 1

| Example | Blends | Stretchable LCP | % Break Strain |
|---|---|---|---|
| 1 | 90% PET/10% LCP | Yes | 37 |
| C1 | 90% PET/10% LCP | No | 23 |

EXAMPLE 2 TO 7 AND C2 TO C7

Fiber Blends

Materials

The polypropylene (PP) used in the fiber blends was a fiber grade PP (4712E1) supplied by Exxon Chemical Americas under the tradename ESCORENE and the polyester (PET grade 86H) used in the fiber blends was supplied by KoSa.

The non-stretchable LCP used for all fiber blends was Vectran™ V100P, a low melting LCP supplied by Ticona.

The stretchable LCP used in the PP blends contained 30 mole % p-hydroxybenzoic, 30 mole % 6-hydroxy-2-napthoic acid, 20 mole % terephthalic acid, 10 mole % resorcinol and 10 mole % 4,4-biphenol monomer units and had an MV of 130 kpa at a shear rate of 1000 sec$^{-1}$ when measured in a capillary rheometer using an orifice 1 mm in diameter and 20 mm long. This stretchable LCP was also used in the 70% PET/30% LCP blends.

The stretchable LCP used in the 90% PET/10% LCP blends contained 30 mole % p-hydroxybenzoic, 30 mole % 6-hydroxy-2-napthoic acid, 10 mole % terephthalic acid, 10 mole % isophthalic acid arid 20 mole % 4,4'-biphenol monomer units and had an MV of 154 kpa at a shear rate of 1000 sec$^{-1}$ when measured in a capillary rheometer using an orifice 1 mm in diameter and 20 mm long.

Blending

The polymers were dried overnight before they were blended. The PP resins were dried at 130° C., the LCPs were dried at 90° C. and the PET resins were dried at 80° C.

The resins were then blended using a ZSK 30 twin screw extruder at temperatures ranging through the extruder from 210 to 245° C. for the PP blends, and 250 to 305° C. for the PET blends.

Fiber Spinning and Drawing

Blends were dried under vacuum overnight at 95° C. and spun into fiber through a 0.2 mm spinneret using a single filament spinning machine. For each blend, two take-up speeds were used to produce a thicker fiber (50 rpm take up) and a thinner fiber (200 rpm take-up).

Drawn or stretched samples were prepared by taking the "as spun" fibers and placing them in a tensile tester hot box at 140° C. The Fibers were conditioned for 6 minutes and then stretched to 200% elongation at 100%/min strain rate while maintaining the fiber at 140° C. These drawn samples were then reconditioned at 23° C. and 50% relative humidity (RH) for measurement of break strain. The percentage elongation at break (% break strain) and break energy for these samples, both measured pursuant to ASTM D638, is shown in Table 2 below.

TABLE 2

| Example | Blends | Stretchable LCP | Take up (RPM) | % Break Strain | Break Energy (Kilodyne-cm) |
|---|---|---|---|---|---|
| 2 | 90% PP/10% LCP | Yes | 200 | 210 | 84 |
| C-2 | 90% PP/10% LCP | No | 200 | 33 | 7 |
| 3 | 90% PP/10% LCP | Yes | 50 | 254 | 338 |
| C-3 | 90% PP/10% LCP | No | 50 | 68 | 57 |
| 4 | 90% PET/10% LCP | Yes | 200 | 190 | 63 |
| C-4 | 90% PET/10% LCP | No | 200 | 106 | 36 |
| 5 | 90% PET/10% LCP | Yes | 50 | 246 | 271 |
| C-5 | 90% PET/10% LCP | No | 50 | 189 | 215 |
| 6 | 70% PET/30% LCP | Yes | 200 | 4.9 | 11 |
| C-6 | 70% PET/30% LCP | No | 200 | 0 | 0 |
| 7 | 70% PET/30% LCP | Yes | 50 | 6.7 | 23 |
| C-7 | 70% PET/30% LCP | No | 50 | 3.7 | 4 |

The data shows that the stretchable LCP blends have greater % strain and break energy than comparable blends wherein the liquid polymer is a non-stretchable LCP.

The foregoing is illustrative of the present invention and is not construed as limiting thereof. The invention is defined by the following with equivalents of the claims to be included therein.

What is claimed is:

1. A liquid crystal polymer (LOP) blend comprising:
   (a) a stretchable LCP; and
   (b) a thermoplastic polymer capable of being oriented at processing temperatures of from about 120° C. to about 160° C.,
wherein the stretchable LCP is a liquid crystal polymer that is capable of being stretched to at least 100% elongation before breaking or rupturing when spun into tapes and tested according to the Tape Stretching Procedure at a test temperature of 150° C.

2. The blend of claim 1 wherein the stretchable liquid crystal polymer is present in the blend in an amount of from about 1 to about 30% by weight, based on the total weight of the stretchable liquid crystal polymer and thermoplastic polymer components thereof.

3. The blend of claim 2 wherein said stretchable liquid crystal polymer is present in the blend in an amount of from about 5 to about 20% by weight, based on the total weight of the stretchable liquid crystal polymer and thermoplastic polymer components thereof.

4. The blend of claim 2 wherein said thermoplastic polymer is selected from the group consisting of polyethylene, polypropylene, polybutylene, poly(ethylene terephthalate), polyamide, ethylene vinyl acetate, ethylene vinyl alcohol, and cyclic olefin copolymer.

5. The blend of claim 4 wherein said blend is formed into a film, sheet, fiber, composite or a shaped article.

6. The blend of claim 2 wherein said stretchable liquid crystal polymer is present in the blend in an amount of from about 5 to about 15% by weight, based on the total weight of the stretchable liquid crystal polymer and thermoplastic polymer components thereof.

7. The blend of claim 6 wherein said thermoplastic polymer is selected from the group consisting of polyethylene, polypropylene, and poly(ethylene terephthalate).

8. The blend of claim 2 that further comprises a compatibilizer.

9. The blend of claim 8 wherein the compatibilizer is selected from the group consisting of a polyester polyurethane, a polyether polyurethane, a polyester elastomer, a polyether elastomer, a polyamide, a polyether polyamide, a polyether polyimide, or a functionalized polyolefin, wherein said functionalized polyolefin comprises functional groups selected from the group consisting of: a carboxyl group and its esters, a carboxylic anhydride group, a glycidyl group, an alkoxysilane group and combinations thereof.

10. The blend of claim 8 wherein the compatibilizer is selected from the group consisting of ethylene-maleic anhydride copolymer, ethylene-methyl acrylate copolymer, ethylene-methyl acrylate copolymer grafted with maleic anhydride, ethylene-methyl acrylate-maleic acid terpolymer, ethylene-glycidyl methacrylate copolymer, ethylene-methyl acrylate-glycidyl methacrylate terpolymer, ethylene-methyl methacrylate-acrylic acid terpolymer, ethylene-vinyl acetate copolymer, an alkoxysilane modified ethylene-ethylacrylate copolymer, ethylene-acrylic acid copolymer, and a blend of polypropylene grafted with maleic anhydride with a dimer based polyamide.

11. The blend of claim 8 wherein the amount of compatibilizer present in the blend ranges from about 0.1 to about 30 weight %, based on the total weight of the stretchable liquid crystal polymer and the thermoplastic polymer.

12. The blend of claim 2 wherein said blend is formed into a film, sheet, fiber, composite or a shaped article.

13. The blend of claim 2 which is formed into a shaped article which is stretched to orient and strengthen the thermoplastic polymer portion of the blend.

14. The blend of claim 2 which is formed into a multilayer film comprising one or more layers of said blend and one or more layers of a thermoplastic.

15. The blend of claim 2 which is formed into a monofilament, multifilament, or a bicomponent fiber.

16. A liquid crystal polymer (LCP) blend comprising:

(a) a liquid crystal polymer; and (b) a thermoplastic polymer selected from the group consisting of: polyethylene, polypropylene, polybutylene, polyamide, poly(ethylene terephthalate), ethylene vinyl acetate, ethylene vinyl alcohol, and cyclic olefin copolymer;

wherein said liquid crystal polymer consists essentially of recurring units I, II, III, IV and V, wherein:

recurring unit I is

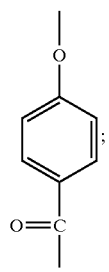

recurring unit II is:

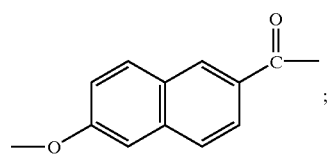

recurring unit III is:

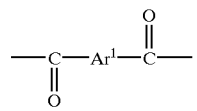

wherein Ar¹ is selected from the group consisting of:

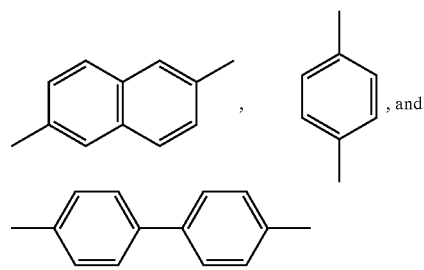

and mixtures thereof;

recurring unit IV is:

wherein Ar² is selected from the group consisting of:

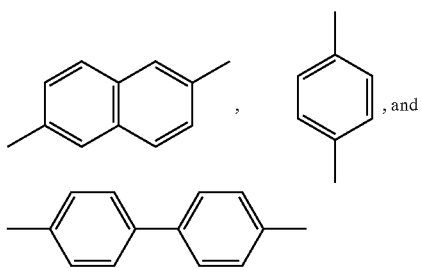
, and and mixtures thereof, and X is independently selected from the group consisting of O and NR² wherein R² is independently selected from the group consisting of hydrogen and a C₁ to C₆ alkyl; and recurring unit V is selected from the group consisting of:

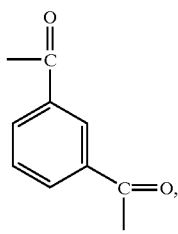
(Vb)

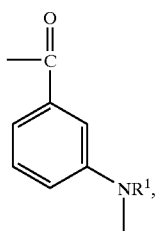
(Vc)

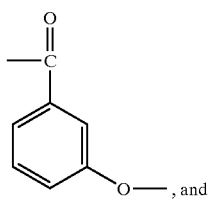
, and
(Vd)

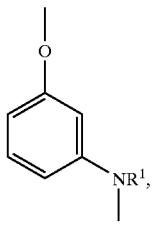

and mixtures thereof, wherein R¹ is independently selected from the group consisting of hydrogen and C₁ to C₆ alkyl;

wherein recurring unit I is present in the liquid crystal polymer in an amount of from about 15 to about 60 mole percent, recurring unit II is present in the liquid crystal polymer in an amount of from about 15 to about 60 mole percent, recurring unit III is present in the liquid crystal polymer in an amount of from about 5 to about 20 mole percent, recurring unit IV is present in the liquid crystal polymer in an amount of from about 5 to about 20 mole percent, and recurring unit V is present in the liquid crystal polymer in an amount of from about 7 to about 15 mole percent and wherein:

(a) recurring units I and II combined are present in the liquid crystal polymer in an amount of from about 50 to about 75 mole percent and (b) the liquid crystal polymer contains at least about 5 mole percent of recurring units of the formula:

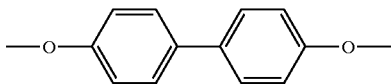

with the proviso that recurring unit II is present in the liquid crystal polymer in an amount of at least about 30 mole percent, if and when the liquid crystal polymer also contains:

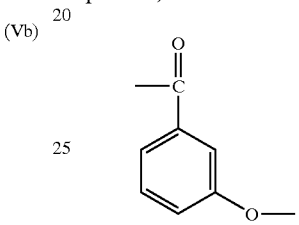
(Ve)

in combination with a total from 0 to about 5 mole percent of units selected from the group consisting of units (Vb), (Ve) and (Vd) and mixtures thereof.

17. A liquid crystal polymer (LCP) blend comprising:
(a) a liquid crystal polymer; and
(b) a thermoplastic polymer selected from the group consisting of: polyethylene, polypropylene, polybutylene, polyamide, poly(ethylene terephthalate), ethylene vinyl acetate, ethylene vinyl alcohol, and cyclic olefin copolymer;

wherein said liquid crystal polymer consists essentially of recurring units I, II, III, IV and V, wherein:

recurring unit I is

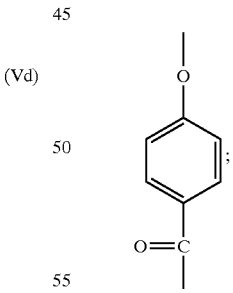
I recurring unit II is:

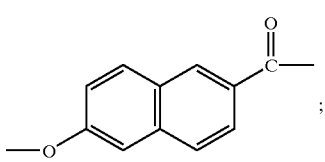
II recurring unit III is:

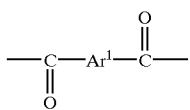
III wherein is Ar¹ is selected from the group consisting of:

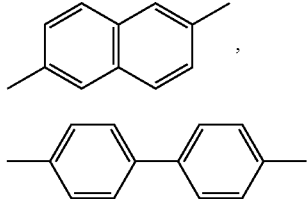
and mixtures thereof;

recurring unit IV is:

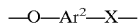
—O—Ar²—X— wherein Ar² is selected from the group consisting of:

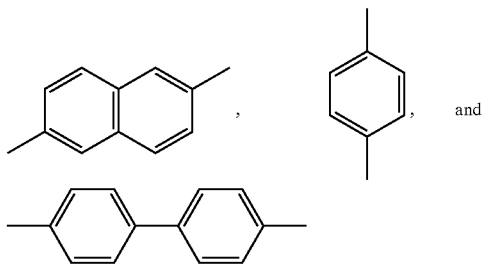
and mixtures thereof, and X is independently selected from the group consisting of O and NR² wherein R² is independently selected from the group consisting of hydrogen and a $C_1$ to $C_6$ alkyl; and recurring unit V is a dioxy unit of the formula:

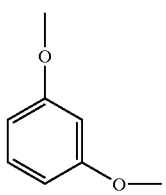
(Va)

in combination with at least one additional unit selected from the group consisting of:

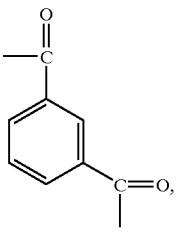
(Vb)

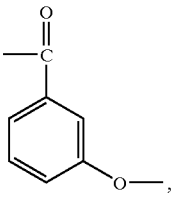
(Vc)

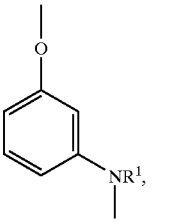
(Vd)

and

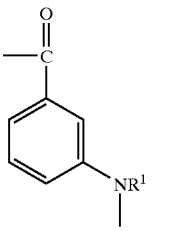
(Ve)

wherein $R^1$ is independently selected from the group consisting of hydrogen and $C_1$ to $C_6$ alkyl,
wherein recurring unit I is present in the liquid crystal polymer in an amount of from about 15 to about 60 mole percent, recurring unit II is present in the liquid crystal polymer in an amount of from about 15 to about 60 mole percent, recurring unit III is present in the liquid crystal polymer in an amount of from about 5 to about 20 mole percent, recurring unit IV is present in the liquid crystal polymer in an amount of from about 5 to about 20 mole percent, and recurring unit V is present in the liquid crystal polymer in an amount of from about 7 to about 15 mole percent and wherein:
  (a) recurring units I and II combined are present in the liquid crystal polymer in an amount of from about 50 to about 75 mole percent and
  (b) the liquid crystal polymer contains at least about 5 mole percent of recurring units of the formula:

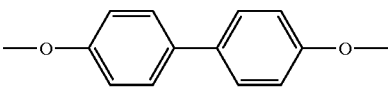

with the proviso that recurring unit II is present in the liquid crystal polymer in an amount of at least about 30 mole percent, if and when unit (Vc) is also present and the units (Va), (Vb), (Vd), and (Ve) combined, constitute up to about 5 mole percent of the liquid crystal polymer.

18. A liquid crystal polymer (LOP) blend comprising:

(a) a liquid crystal polymer; and (b) a thermoplastic polymer selected from the group consisting of polyethylene, polypropylene, polybutylene, polyamide, poly(ethylene terephthalate), ethylene vinyl acetate, ethylene vinyl alcohol, and cyclic olefin copolymer, wherein said liquid crystal polymer consists essentially of recurring units I, II, III, IV and V, wherein:

recurring unit I is

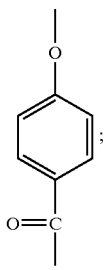

I recurring unit II is:

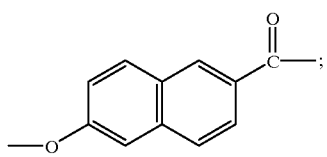

II recurring unit III is:

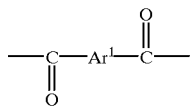

III wherein $Ar^1$ is selected from the group consisting of:

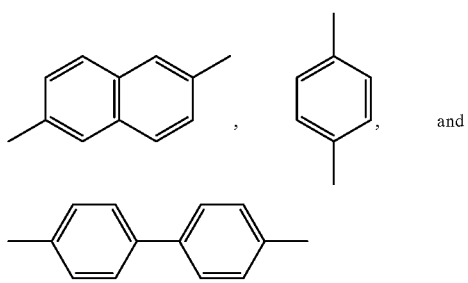

and mixtures thereof;

recurring unit IV is:

—O—$Ar^2$—X— wherein $Ar^2$ is selected from the group consisting of:

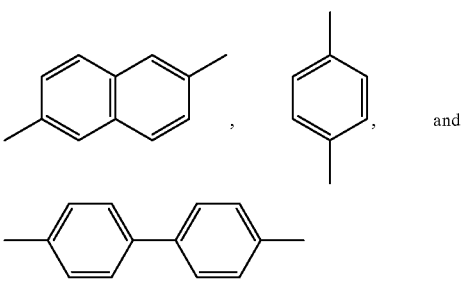

and and mixtures thereof; and X is independently O or $NR^2$ wherein $R^2$ is independently selected from the group consisting of hydrogen and a $C_1$ to $C_6$ alkyl; and recurring unit V is:

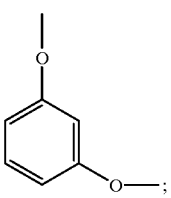

wherein recurring unit I is present in the liquid crystal polymer in an amount of from about 15 to about 60 mole percent, recurring unit II is present in the liquid crystal polymer in an amount of from about 15 to about 60 mole percent, recurring unit III is present in the liquid crystal polymer in an amount of from about 5 to about 20 mole percent, recurring unit IV is present in the liquid crystal polymer in an amount of from about 5 to about 20 mole percent and recurring unit V is present in the liquid crystal polymer in an amount of from about 7 to about 15 mole percent; wherein:

(a) recurring units I and II combined are present in the liquid crystal polymer in an amount of from about 50 to about 75 mole percent and (b) the liquid crystal polymer contains at least about 5 mole percent of recurring units of the formula:

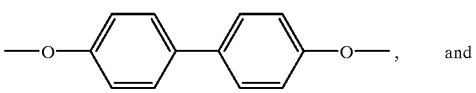 and (c) at least a portion of recurring unit III is:

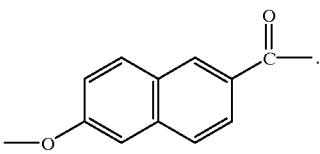

19. A melt blend comprising:

(a) a stretchable liquid crystal polymer; and (b) a non-liquid crystal thermoplastic polymer capable of being oriented at processing temperatures of from about 120° C. to 160° C., wherein said liquid crystal polymer is present in the blend in an amount of from about 5 to about 15% by weight, based on the total weight of the stretchable liquid crystal polymer and the non-liquid crystal thermoplastic polymer components thereof and wherein the stretchable liquid crystal polymer is a polymer that is capable of being stretched to at least 200% elongation before breaking or rupturing when spun into tapes and tested according to the Tape Stretching Procedure at a test temperature of 150° C.

20. A shaped article formed from a melt blend comprising:
   (a) a stretchable liquid crystal polymer capable of being stretched to at least 100% elongation before breaking or rupturing when spun into tapes and tested according to the Tape Stretching Procedure at a test temperature of 150° C.; and
   (b) a non-liquid crystal thermoplastic polymer capable of being oriented at processing temperatures of from about 120° C. to about 160° C., wherein said shaped article has been stretched to at least about 100% elongation at a temperature of from about 120° C. to about 160° C.

21. A shaped article as described in claim 20 which has been stretched to at least 200% elongation at a temperature of from about 120° C. to about 160° C.

22. A shaped article as described in claim 20, wherein said non-liquid crystal thermoplastic polymer is selected from the group consisting of polyethylene, propylene, and polyethylene terephthalate.

23. A shaped article as described in claim 20, wherein said shaped article is a fiber.

24. A shaped article as described in claim 20, wherein said shaped article is a film.

25. A shaped article as described in claim 20, wherein said shaped article is a blow molded article.

* * * * *